US005644625A

United States Patent [19]
Solot

[11] Patent Number: 5,644,625
[45] Date of Patent: Jul. 1, 1997

[54] AUTOMATIC ROUTING AND REROUTING OF MESSAGES TO TELEPHONES AND FAX MACHINES INCLUDING RECEIPT OF INTERCEPT VOICE MESSAGES

[75] Inventor: Edwin L. Solot, Los Angeles, Calif.

[73] Assignee: Faxts-Now, Inc., Los Angeles, Calif.

[21] Appl. No.: 523,081

[22] Filed: Sep. 1, 1995

[51] Int. Cl.$^6$ .................................................. H04M 3/42
[52] U.S. Cl. ........................ 379/88; 379/67; 379/213; 379/216; 379/201; 358/440
[58] Field of Search .................................. 379/58, 59, 67, 379/88, 216, 213, 354, 201, 355, 356; 395/2.79, 2.84; 358/440, 439

[56] References Cited

U.S. PATENT DOCUMENTS

| | | | |
|---|---|---|---|
| 4,593,157 | 6/1986 | Usdan | 379/355 |
| 4,933,968 | 6/1990 | Iggulden | 379/213 |
| 5,247,591 | 9/1993 | Baran | 358/440 |
| 5,406,621 | 4/1995 | Binal | 379/88 |
| 5,509,049 | 4/1996 | Peterson | 379/212 |

FOREIGN PATENT DOCUMENTS

| | | |
|---|---|---|
| 0619668 | 3/1994 | European Pat. Off. . |
| 1-155752 | 6/1989 | Japan ........................ 379/70 |

OTHER PUBLICATIONS

Conway et al, "Voice Recognition at the Cellular Switch: Automating 411 Call Completion" undated.
"Voice Activated Dialling," VI Incorporating WT, pp. 54–55 Jan. 1995.
"Method and Apparatus for Automatic Contextual Call Return, Calendering, and Address book search," IBM Technical Disclosure Bulletin, vol. 37 No 04A pp. 373–374 Apr. 1994.
"Mechanism to Automate Updating Obsolete Telephone Numbers," IBM Technical Disclosure Bulletin vol. 37 No 04A pp 115–116 Apr. 1994.

Primary Examiner—Krista M. Zele
Assistant Examiner—Daniel S. Hunter
Attorney, Agent, or Firm—Edwin H. Paul; Jerry Cohen; Perkins, Smith & Cohen, LLP

[57] ABSTRACT

An automatic system for routing and rerouting of messages between machines via the telephone, including automatically responding where a voice intercept message, provided by the telephone company, is encountered. Information such as faxes are sent to a data base of telephone numbers, when an voice intercept message is encountered the system will record and decipher the message, and depending on the message, either complete the call or report the status such that the database of telephone numbers is updated and/or corrected.

10 Claims, 5 Drawing Sheets

AUTOMATIC ROUTING AND REROUTING OF MESSAGES TO TELEPHONES AND FAX MACHINES INCLUDING RECEIPT OF INTERCEPT VOICE MESSAGES

FIELD OF THE INVENTION

The present invention relates generally to speaker independent voice monitoring and recognition systems over telephone networks. More particularly, this invention relates to the capture, analysis and storage of information contained in voiced intercept messages and particularly those messages containing information regarding changes of telephone numbers and/or area codes.

BACKGROUND OF THE INVENTION

Telephone numbers used for voice and data have been stored in many different media from printed hard copy (e.g. typewritten or handwritten ROLODEX™ cards) to a variety of electronic media (data bases utilizing computer programs with telephone systems, and the like). When a telephone number has been taken out of service for any reason, the calling party receives a voice message provided by the telephone company describing the reason why the placed call cannot be completed. The messages include: those indicating the phone number has been disconnected; all circuits are busy; and informational messages containing a change of phone numbers and/or area code which results from a relocation of the called party or an area code reorganization in which the called party resides. In the event that a call cannot be properly completed and where the calling party receives an intercept informational message containing a change of telephone number, the calling party must record, usually by hand, the information, hang up and place the call a second time. Additionally, the calling party must then update the old telephone number with the new telephone number in the telephone number storage system which they use. This process is manual, time consuming and error prone. In some automated telephony applications, such as broadcast facsimile services, the calling party being a computer system is unaware that the phone number has changed, and the system remains unaware until a manual review is performed where the new number is manually obtained and the database of telephone numbers updated. Before this manual updating, which may be an extended length of time, the distribution of information to such telephone numbers cannot be accomplished.

An example of prior art message handling apparatus and methods is found in U.S. Pat. No. 5,333,266, entitled "METHOD AND APPARATUS FOR MESSAGE HANDLING IN COMPUTER SYSTEMS", to Boaz et al., and assigned to International Business Machines Corp. This patent discloses an integrated system for messages of different media types such as text, voice facsimile, video and image. The user can request another file server and its associated terminals to perform messaging services. For the majority of transactions, the protocol is independent of message body format, and this system can send or rout voice messages, data, ASCII code or E-mail with much flexibility. However, the system, when an intercepted voice message is received, requires human intervention to update the system as described above. This system when an unexpected intercept voice message is received, for example containing information that the telephone number has been changed, cannot function. This system has no mechanism for interpreting the unexpected voice message received, and no mechanism for following the information content to complete the call or record the changed telephone number or be aware that the telephone may be disconnected.

It is an object of the present invention to provide for automatically recognize and record any received intercept voice message from a called number.

It is another object of the present invention to decode or decipher the voice message for content and to respond to that content. It is yet another object of the present invention to determine if a new telephone number has replaced the called number, and to recognize that new number and to replace the old number with the new number.

Another object of the present invention is to decode an intercepted voice message to determine is the called number is disconnected or otherwise not is use.

It is yet another object of the present invention to record and report to the caller the status of the called numbers, including those numbers for which an intercept voice message was received.

SUMMARY OF THE INVENTION

The above objects are met in apparatus wherein apparatus for automatic routing and rerouting of messages between machines via the telephone, including responding where a voice message intercept is encountered, including: means for storing telephone numbers, means for placing calls to said stored telephone numbers, means for recognizing that a voice intercept message is being returned, means for determining the content of the voice intercept message, and responsive to said content, means for handling said call.

In the present invention "handling the call", in a preferred embodiment, defined as providing at least means: tier automatically faxing a report of each call placed, for updating said stored telephone numbers by replacing the old number with a new number, and for reporting automatically other contents of the intercept messages such that corresponding logical adaptations can be made. For example, the present invention further provides means for determining and reporting to a subscriber that the intercept message content includes that: the phone number is out of service, the phone number has been disconnected with no forwarding number available, the call cannot be completed to the phone number listed, and/or that the phone number that was dialed has been changed and a new number is provided. The present invention provides means to update the telephone number database and complete a call where a new number has been provided in the voice intercept message.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
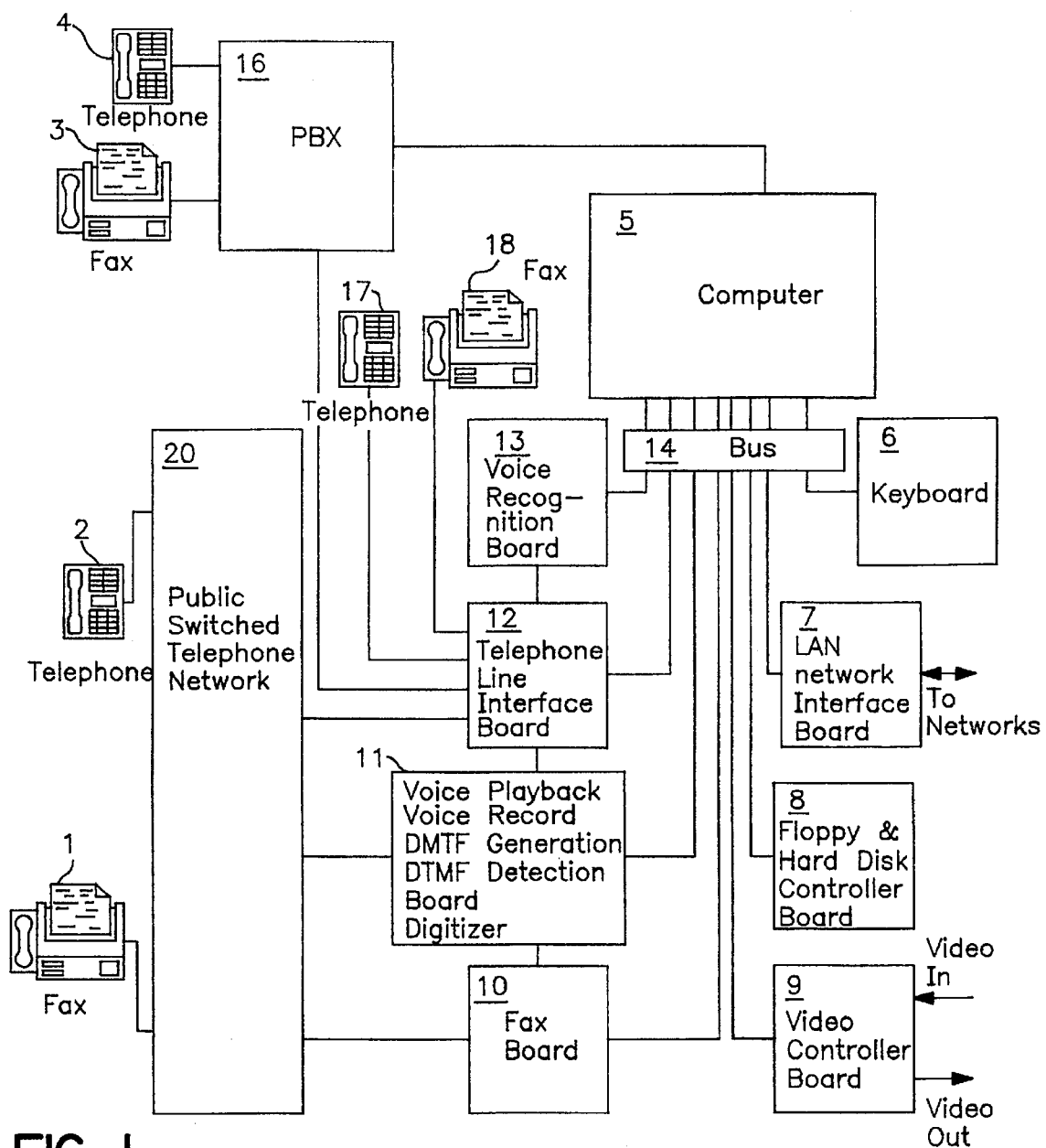
FIG. 1 is a hardware block diagram of a preferred embodiment of the present invention.

FIG. 1 shows a block diagram of a preferred system made in accordance with the present invention. The system includes a computer 5 with an input/output bus 14 joining a number of specialized interfaces or peripherals to the computer. These peripherals are a keyboard 6, a floppy or hard disk and controller 8, a video controller 9, a network interface 7, a fax interface 10, a telephone line interface 12, a voice recognition board 13, and a voice playback/record board with DMTF generation and detection 11. The fax interface, the voice playback/record, and the telephone line interface board are all connected to the switched public telephone network 20. The public telephone network connects to virtually any telephone, recorder, fax or other of the many devices that are connected to the telephone lines anywhere in the world. The telephone line interface board is a multiplexed unit that can accommodate direct connections from a telephone 17, fax 18, or a PBX (private branch exchange) 16. The PBX connects to a network of telephones 4 or fax machines 3.

The computer, fax, keyboard, network boards, disks, video and the telephone interface boards are all standard boards that have alternatives that are functionally, if not exactly, equivalents.

The hardware block diagram of FIG. 1 is arranged to allow a flexible system to accept a voice, data, fax, video (if the hardware will accommodate video) or other such message from many different sources and to then broadcast or re-rout the message to many recipients derived from a database of telephone numbers supplied. The message to be distributed may come into the system from:

(a) A telephone 2 or fax machine 1 via the public switched network 20.

(b) A telephone 17 or fax 18 connected directly to a telephone line interface 12. The telephone line interface 12 may be any of a number of standard interfaces that "answer" the telephone by going off-hook and including means to accept or send the tones over the telephone lines.

(c) A local area network 7, or other such networks as are known in the art.

(d) A video controller board arranged to accept video signals and where the system is arranged with enough memory, say via the disk controller 8, to store enough frames of video for later re-routing.

(e) A PBX connected to a network of telephones, computers and/or fax machines.

Telephone numbers which are the destination telephone numbers for the messages, are stored into a large database on the disk 8. These databases are arranged and indexed such that specific messages to be sent by a client are keyed to the proper database of telephone numbers.

In practice when a fax message is sent to a receiving telephone number, the message is sent via the fax board 10 which includes a modem, preferably the JT FAX made by Hayes Microcomputer Products. When a data or voice message is to be sent over the telephone lines the computer activates the telephone line interface 12 (TLI), preferably the TLI made by Voice Processing Corp. This TLI board connects via ribbon cable to the Voice Recognition board 13, and to the Voice Playback/Voice Record board 11, and to the public switched telephone network. In another embodiment the present invention may be implemented within the public switched telephone network. With any of these hardware arrangements, the called number may be inoperable for some reason, and the telephone company often will intercept the call and reply with a voice message informing the caller of the status of the called telephone number. When this occurs the intercept voice message is digitized and stored by the Voice playback/Voice Record/DTMF Generation/DTMK Recognition board 11. Preferably, this board is the D41 made by Dialogic Corp. The Voice Recognition board 13 is preferably the VPro-42 made by Voice Processing Corp., However, dialogic makes a competing board which may be used with suitable programming changes as are well known in the art. The recorded voice message is decoded or deciphered by the voice recognition board such that any number that has been changed may be discovered and the corresponding database updated and the client informed.

The present invention makes use of the above commercially available electronics hardware, in addition, the present invention uses commercially available system software. In a preferred embodiment, that system software includes an original language assembler and/or compiler or the like, an operating system, and any and all system software and library software available with the system and application software. In a preferred embodiment, a C compiler is used with a windows based personal computer having sufficient RAM, disk, and other peripherals (printers, CRT's, etc.) for creating, debugging and executing the software and hardware of the present invention. The use of "a C compiler" is defined herein generically to mean any of the compilers developed around the C language. However, BASIC, Pascal or even the assembly language of the embedded microprocessor could be used. In addition, virtually any of the popular operating systems found on a wide variety of personnel and larger computers can be used to advantage with the present invention, including DOS, Windows, or Macintosh, or other such operating systems. Moreover, virtually any file structure used with the above hardware, software and physical structures are well known in the personal computer and communications art fields and any such commercially available hardware and software can be used to advantage with the present invention. In particular, the file structure used in the preferred embodiments can be virtually any structure defined and implemented with any of the above system software packages. The present invention can utilize any system where files are accessed, read, edited and returned for storage; where files are interrogated for content and decisions made on these contents. These files and their titles or labels, their storage addresses, header, ending, error checking and other such framing characters and details of the files, and the logic hardware or software to perform the tasks found in the flow charts of the present invention are those that are part of the particular system software and hardware on which the present invention may be installed and practiced. All of the above are well known hardware and software usages and techniques of computer/communication technology.

In addition, the scope of the present invention includes analog storage of the intercept voice message, and subsequent analysis, where the analysis may be performed in the analog domain or analog/digital combinations where the stored voice intercept message is digitized at some point to facilitate analysis. The minimum analog hardware, at least where a voice intercept message is received that is designed to be understood by humans, is the analog receiver. Subsequent to the analog receiver, virtually all hardware can be digital.

Referring still to FIG. 1, the analog signal on the telephone line is converted to a digital signal in the Voice Playback/Voice Record board 11. The signal is digitized in board 11 and the data stored in the computer. The data is recognized by the Voice Recognition board 13 and the utterance is determined with a confidence level which is sent back to the computer for storage. When a completed intercept message is received and decoded the system will handle the call by calling the new number, if the intercept message indicated that a telephone number was changed. If no new number is received the inventive system will store that message to relay back to the calling program so that the inactive telephone number is not called again. The handling of an intercept message includes replacing the called number with a new number, discarding the called number form the stored numbers, and sending a message to the customer that supplied the initial database of numbers.

In addition, in other preferred embodiments many hardware elements described herein can be replaced by software elements, and, correspondingly, software elements can be replaced by hardware. These replacements are well known in the art where the minimum hardware required is a physical receiver of the voice signal and a computer system.

Figure 2A:
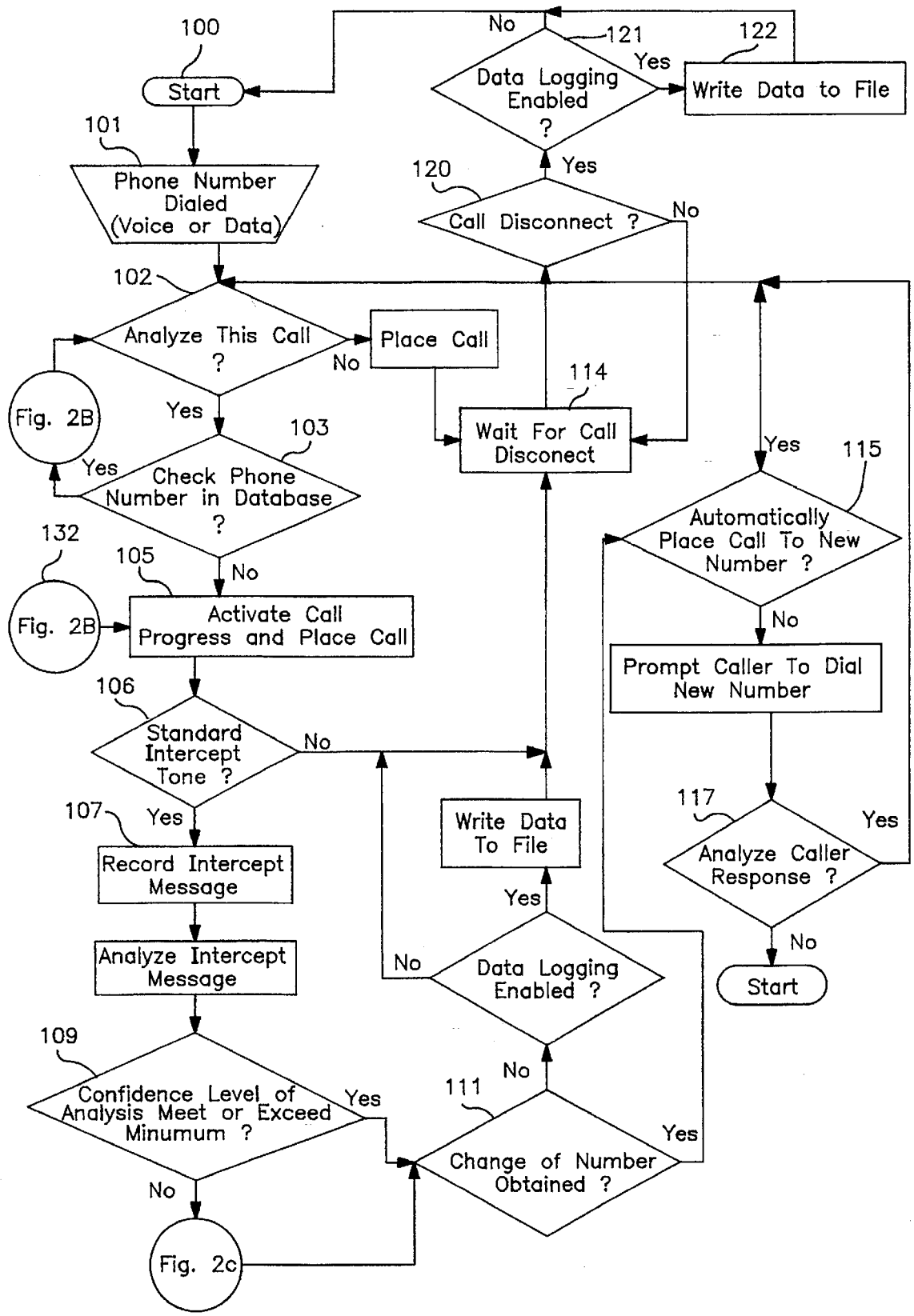
FIGS. 2A, 2B, 2C, and 2D are flow charts describing the operation of a preferred embodiment.

The block diagram of FIG. 2A describes the system operation of the hardware of FIG. 1. When the system is started 100 a prescribed telephone number is retrieved that is to be dialed 101. If the number being called is not to be analyzed, then the number is dialed. When an off hook signal is received the data or voice is sent to the called number. The system waits for a call disconnect, and when the data logging is enabled 121, data is written to a file 122 in the computer memory to document the call. The data logging may be disabled where there is essentially no record kept of the details of the call. When the disconnect signal 114, 120 is received from the called telephone being hung up the system reverts back the start state 100. When the call is to be analyzed 102 the telephone number is checked 103 against a list of telephone numbers stored in a database. If the telephone number is not in the database 103 the number is dialed. If an off hook signal is received the data or voice message is sent and the call information is logged or not as programmed and as described previously. However, if a standard intercept signal or tone is received 106, the present invention records the intercept message 107. The inventive apparatus recognizes the standard intercept tone by well known techniques which isolate the intercept tone from other audio signals and to determine the presence or absence of the intercept tone. The telephone company when a telephone number is changed, disconnected or other such happening that will not allow the call to be completed will intercept the incoming call and present a recorded voice message back to the caller stating why the call cannot be completed—this is the intercept message and is preceded by a tone or group of tones. When the tone or tones is received the present system will record the voice intercept message.

The present system analyzes the voice message via the voice recognition board (FIG. 1, item 13). The software and the hardware that analyzes the voice is capable of providing a confidence level associated with the decoding of the voice message. A threshold 109 is provided such that when the confidence level meets or exceed the threshold the message contents are processed for a change in telephone number 111. The confidence level is built into the software supplied with the Voice Recognition board. This software determines what the utterance is and supplies a number form zero to 99 to indicate confidence in the utterance being properly determined. The system software will decide what level is suitable for acceptance depending on the errors encountered in a real world environment. If a new telephone number is provided the call may be placed to the new number 115 or a prompt to the caller informing 117 the caller of the new number. If the caller does not want to call the new number the system reverts back to the start 100. Otherwise, if the caller wishes, the new number is dialed and the state reverts to state 102.

Figure 2B:
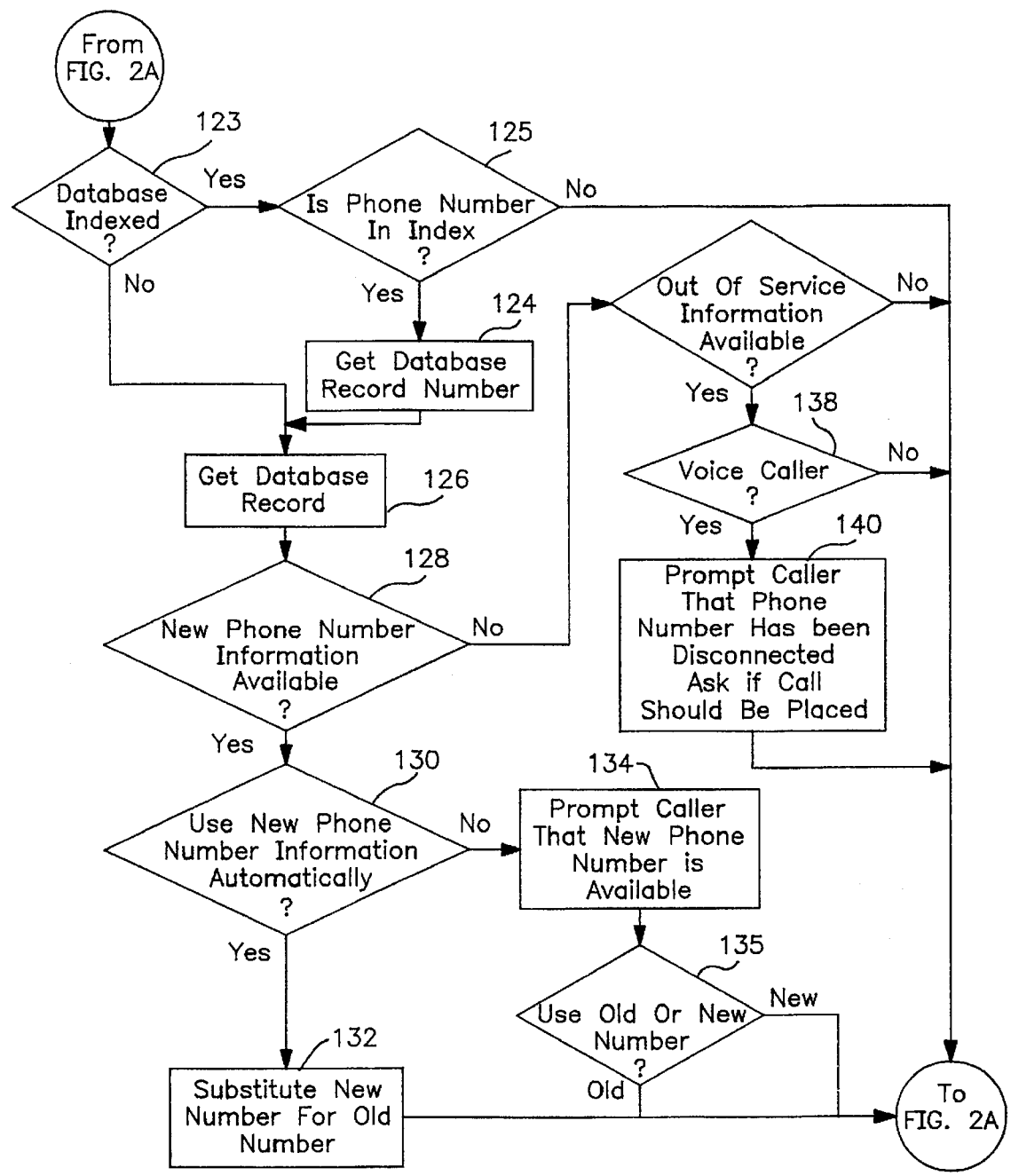

Referring to FIG. 2B, when state 103 is encountered and there is an indication that the telephone number in the database is to be checked state 123 is entered. The database of numbers may be indexed or not. If indexed 125 and the telephone number is not in the index the system reverts to state 102. If the telephone number is in the index the record number 124 is retrieved and then the record is retrieved 126. If from a previous, call an intercept voice message provided a new telephone number 128 that new number is recognized. If the system was programmed to automatically use the new number 130, then the new number replaces 132 the old number and a call is place thereto with the system assuming state 105, of FIG. 2A, if the new number is not to be automatically called a prompt is sent to the caller that a new number is available 134. The caller may determine to use the old or the new number 135 and return to state 105 to continue of FIG. 2A.

If a new telephone number is not available, the system determines if a previous intercept voice message contained information that the number is out of service. If the number is still in service the system reverts to state 105 of FIG. 2A. If the number is out of service and the caller is a human 138 the system prompts the caller that the telephone number is out of service 140, the caller may elect to terminate that call.

Figure 2C:
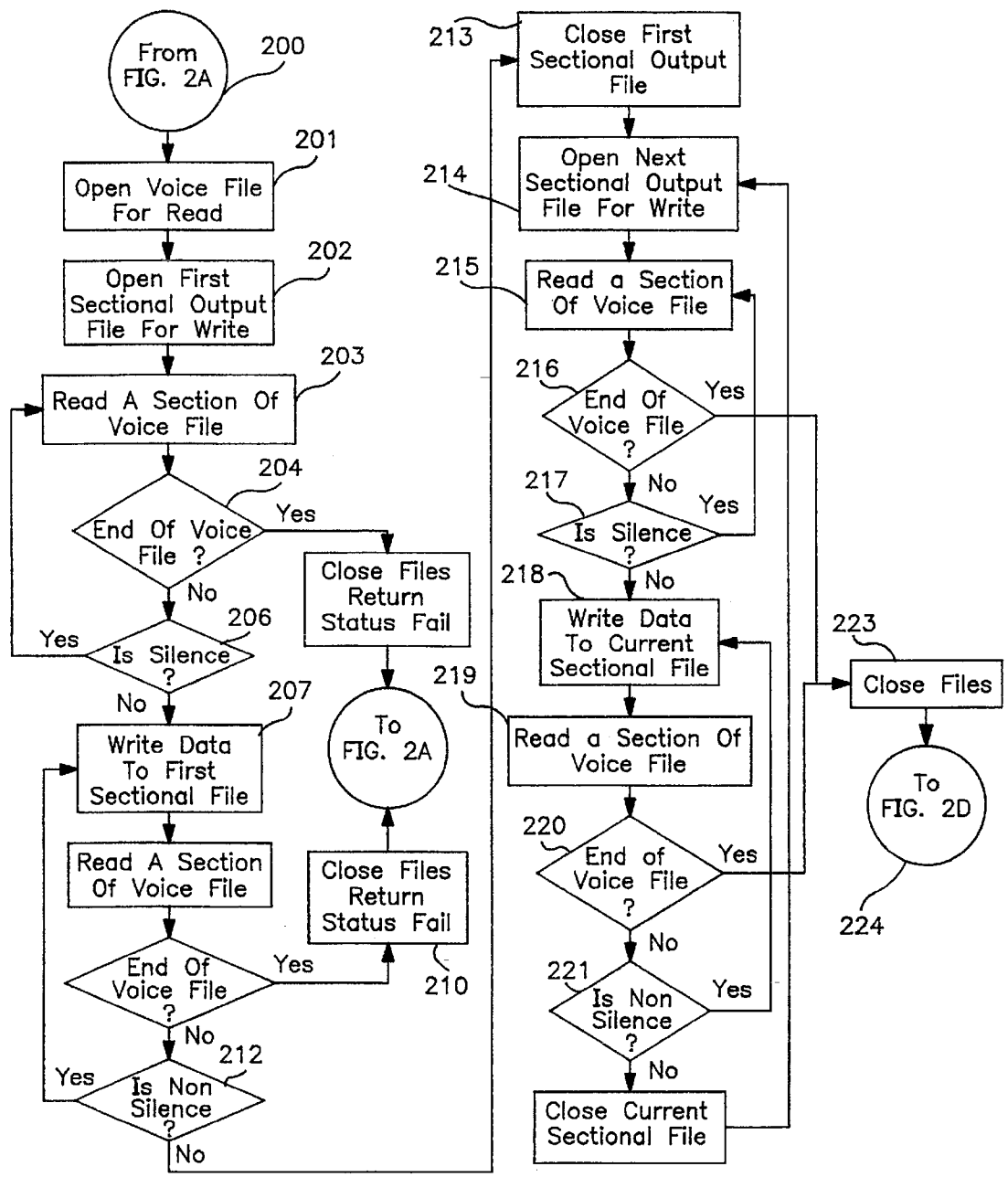

With reference to FIG. 2A, when the confidence level of state 109 is not met the system assumes state 201 of FIG. 2C. The flow chart of FIG. 2C shows the process that reads the stored digitized voice file and decodes or deciphers that file to determines the content of an intercepted voice message and to act in accordance with those contents. First a stored voice file 201 is opened and a corresponding output file 202 is reserved for storing the message. A section 203 of the stored voice file is read—a section may be any convenient length of time, but preferably is a length of about 500 ms (milliseconds). If the end of voice file 204 flag is encountered the program returns eventually to the start (item 100 of FIG. 2A). If silence is detected 206 the next section of the voice file is read. With regard to the earlier description of system hardware and software, the detection of an end of voice file flag is usually accomplished by a character being read that is reserved for a particular meaning. When encountered a bit would be set in a status register or the like which is read by the processor. Regarding the detection of silence, the section of voice file may be stored as a string of 8 bit characters where (in hex notation) 00 refers to a highest level of sound and FF refers to a lowest level of sound (of course the opposite could also be used). In such a case the detection of silence is detecting characters of, say F0 to FF, and considering such levels equal to silence. This detail is well known in the art and similar techniques and details are not further discussed with reference to the discussion of the following flow charts. If the decision diamonds 204 and 206 are passed via the NO exits the section of the voice file read is written into the output file. The next section of the voice file is read 209, if the end of voice file is encountered here the system is bounced back to the start via 210 to item 111 of FIG. 2A. If the next section of voice file is determined to indicate silence 212 that silence is written or stored in the output file 207. The next section of voice file is read and if not silence and there is no end of voice file flag detected the first section of the output file is closed 213. At this point the output file contains the first utterance followed by silence of the stored intercept message.

Still referring to FIG. 2C, the next output file section is opened for storing 214, and the next section of the voice file is read 215. As previously, the end of voice file is checked 216 and if detected the system closes the output file 223 transfers to item 224 of FIG. 2D. If the end of the voice file 216 is not found and if the voice is not silent 217 that voice file section is stored in the opened output file 218. The next section of the voice file is read 219 and if the end of voice file 220 is not found, and there is silence 221, the output section file 220 is closed and the next output file 214 is opened. If at decision point 221 there is not silence the data is written into the output file 215 and the next section of the voice read file is read. This continues until the end of voice file 216 or 220 is activated whereupon the files are closed 223.

Figure 2D:
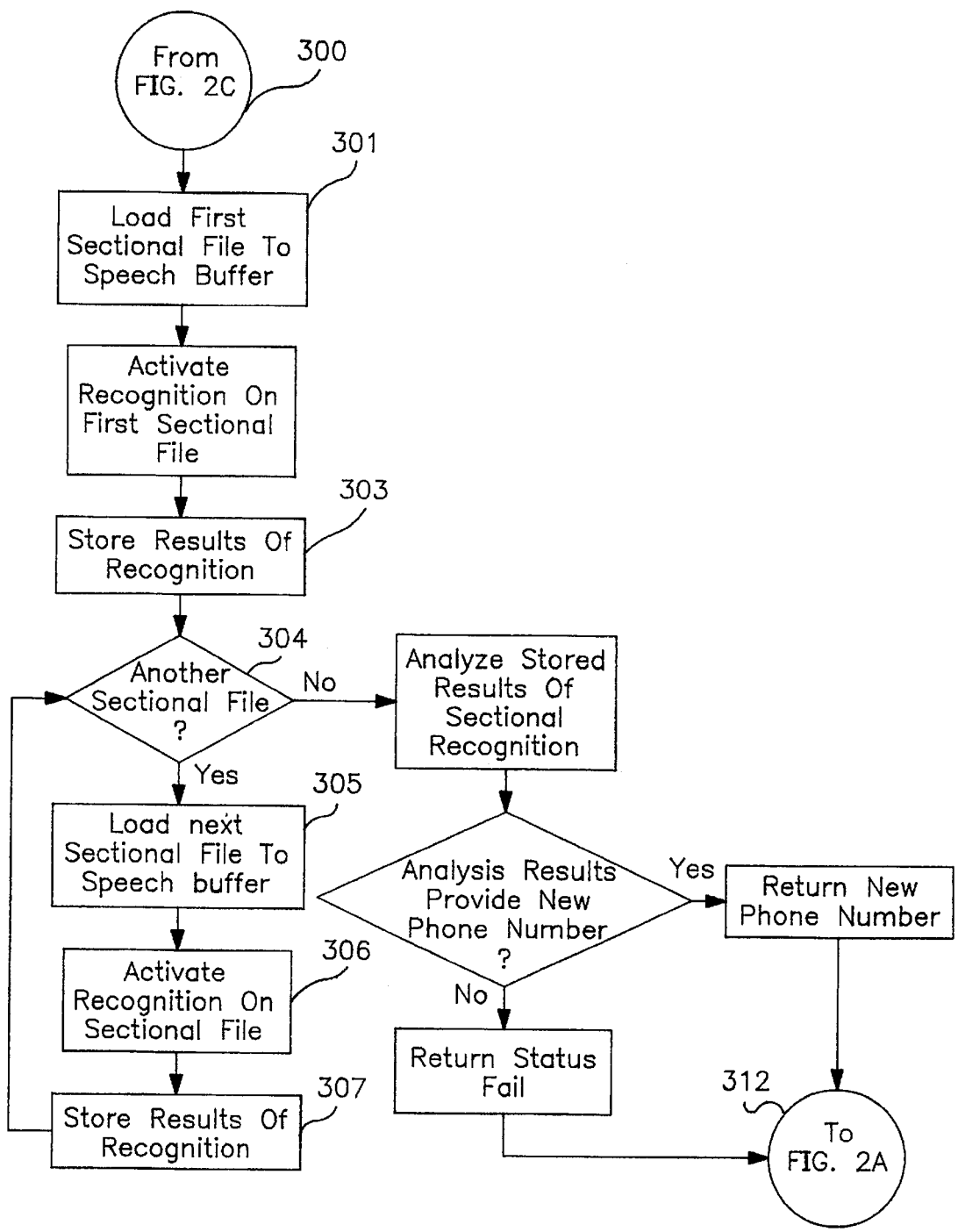

Continued operations for decoding the voice message content is described in FIG. 2D. The first sectional stored output buffer is loaded 301 into a speech buffer. The voice recognition is activated to operate on the speech buffer and the results of recognition are stored in another output buffer the next sectional output stored outputs are loaded and operated on by the voice recognition and the corresponding results stored in the output buffer until all the section outputs stored have been processed, 305, 306, 307. When all the sectional outputs have been processed 304 the system analyzes the output buffers 308. If a new number is provided a new telephone number is stored and the system reverts to decision 111 of FIG. 2A. If a new number is not found in the analysis of the voice message a FAIL status is stored and the decision 111 is entered.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for routing and rerouting of messages between machines via a telephone, including responding where an intercept voice message is received, comprising:
   means for storing telephone numbers,
   means for placing calls to said stored telephone numbers,
   means for automatically recognizing that a voice intercept message is being returned as a result of placing one of the calls,
   means for automatically determining the content of the voice intercept message, and
   means for handling said call responsive to said content.

2. Apparatus as defined in claim 1 further comprising means for automatically faxing a report of each call placed for which an intercept message is received.

3. Apparatus as defined in claim 1 further comprising means for updating said stored telephone numbers.

4. Apparatus as defined in claim 1 further wherein said means for handling said calls comprises: means for deleting said number from said stored numbers when said intercept message content was that the phone number is out of service or that the phone number has been disconnected with no forwarding number available, and means for placing the call later when said intercept message content was that the call cannot be completed to the phone number dialed.

5. Apparatus as defined in claim 4 further comprising means for updating a telephone number database where a new number has been provided in the voice intercept message, and further means to place the call to said new number.

6. Apparatus as defined in claim 1 wherein said means for handling of said call comprises means for placing the call to a new telephone number, and means for terminating the call.

7. Apparatus as defined in claim 1 wherein said means for recognizing comprises: means for receiving a standard intercept signal that signifies that a voice intercept message is being returned and means for electronically isolating and recognizing said standard intercept signal.

8. Apparatus for routing and rerouting of messages between machines via a telephone, including responding where an intercept voice message is received, comprising:
   means for storing telephone numbers,
   means for placing calls to said stored telephone numbers,
   means for receiving a standard intercept signal that signifies that a voice intercept message is being returned as a result of placing one of the calls
   means for automatically recognizing said standard intercept signal,
   means for receiving and automatically determining the content of the voice intercept message,
   means for automatically faxing a report of each call placed for which an intercept message is received,
   means for deleting said number from said stored numbers when said intercept message content was that the phone number is out of service or that the phone number has been disconnected with no forwarding number available,
   means for placing the call later when said intercept message content was that the call cannot be completed to the phone number dialed, and
   means for updating the telephone number database where a new number has been provided in the voice intercept message, and further means to place the call to said new number.

9. A method for routing and rerouting of messages between machines via a telephone, including responding where an intercept voice message is received, comprising:
   storing telephone numbers,
   placing calls to said stored telephone numbers,
   recognizing that a voice intercept message is being returned as a result of placing one of the calls,
   determining the content of the voice intercept message, and
   automatically handling said call responsive to said content, wherein said above steps are performed automatically with computer hardware and software.

10. A method for routing and rerouting of messages between machines via a telephone, including responding where an intercept voice message is received, comprising:
   storing telephone numbers,
   placing calls to said stored telephone numbers,
   receiving a standard intercept signal that signifies that a voice intercept message is being returned as a result of placing one of the calls,
   recognizing said standard intercept signal,
   receiving and determining the content of the voice intercept message,
   automatically faxing a report of each call placed for which an intercept message is received,
   deleting said number from said stored numbers when said intercept message content was that the phone number is out of service or that the phone number has been disconnected with no forwarding number available,
   placing the call later when said intercept message content was that the call cannot be completed to the phone number dialed, and
   updating the telephone number database where a new number has been provided in the voice intercept message, and further means to place the call to said new number, wherein said above steps are performed automatically with computer hardware and software.

* * * * *